(12) United States Patent
Pedretti

(10) Patent No.: US 10,640,169 B2
(45) Date of Patent: May 5, 2020

(54) BICYCLE FRAME

(71) Applicant: Andrea Pedretti, Reggio Emilia (IT)

(72) Inventor: Andrea Pedretti, Reggio Emilia (IT)

(*) Notice: Subject to any disclaimer, the term of this patent is extended or adjusted under 35 U.S.C. 154(b) by 196 days.

(21) Appl. No.: 15/850,099

(22) Filed: Dec. 21, 2017

(65) Prior Publication Data

US 2018/0370589 A1    Dec. 27, 2018

(30) Foreign Application Priority Data

Jun. 21, 2017 (EP) .................................... 17425065

(51) Int. Cl.
*B62K 25/04* (2006.01)
*B62K 25/28* (2006.01)
*B62K 25/12* (2006.01)
*B62K 3/02* (2006.01)

(52) U.S. Cl.
CPC ............... *B62K 25/04* (2013.01); *B62K 3/02* (2013.01); *B62K 25/12* (2013.01); *B62K 25/286* (2013.01); *B62K 2025/044* (2013.01); *B62K 2025/048* (2013.01)

(58) Field of Classification Search
None
See application file for complete search history.

(56) References Cited

U.S. PATENT DOCUMENTS

| | | | | |
|---|---|---|---|---|
| 6,877,591 B1 * | 4/2005 | Hso | ...................... | B62K 25/286 188/321.11 |
| 7,722,072 B2 * | 5/2010 | Hoogendoorn | ...... | B62K 25/286 280/284 |
| 7,891,688 B2 * | 2/2011 | Chamberlain | ......... | B62K 25/30 280/281.1 |
| 8,382,136 B2 * | 2/2013 | Beale | ..................... | B62K 19/18 280/275 |
| 8,430,415 B2 * | 4/2013 | Earle | ..................... | B62K 25/20 280/284 |
| 8,590,914 B2 * | 11/2013 | Domahidy | ........... | B62K 25/286 280/284 |
| 8,851,498 B2 * | 10/2014 | Alsop | ................... | B62K 25/286 280/275 |
| 2012/0056401 A1 * | 3/2012 | Beale | ................... | B62K 25/286 280/284 |
| 2014/0159338 A1 | 6/2014 | Thoma | | |
| 2015/0054250 A1 | 2/2015 | Hu | | |
| 2016/0257371 A1 * | 9/2016 | Droux | ................... | B62K 25/286 |

FOREIGN PATENT DOCUMENTS

WO    2015051472 A1    4/2015

* cited by examiner

*Primary Examiner* — Joseph M Rocca
*Assistant Examiner* — Harold Eric Pahlck, III
(74) *Attorney, Agent, or Firm* — Volpe and Koenig, P.C.

(57) ABSTRACT

A bicycle frame includes a main frame (20); a rear frame (30) articulated to the main frame (20); a rocker link (40) articulated to the main frame (20), through a first hinge axis (B), and to the rear frame (30), through a second hinge axis (C) parallel and eccentric to the first hinge axis (B); a damper (50) arranged between the rear frame (30), through the rocker link (40), and the main frame (20); and a displacement element (60) configured to move the first hinge axis (B) that constrains the rocker link (40) to the main frame (20).

9 Claims, 3 Drawing Sheets

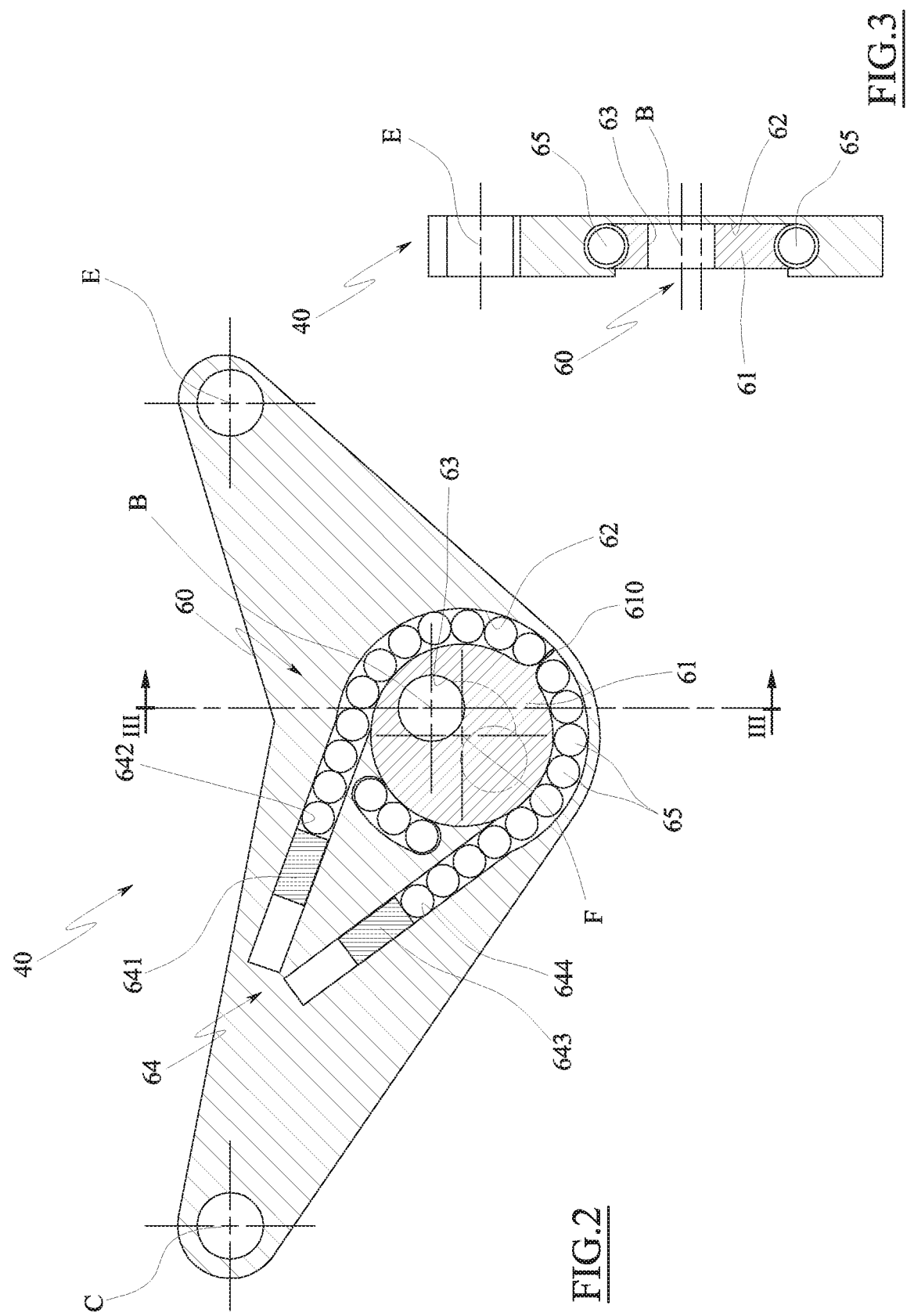

BICYCLE FRAME

TECHNICAL FIELD

The present invention concerns a bicycle frame, in particular a Mountain Bike or Trekking Bike frame.

More specifically, the invention concerns a bicycle frame having variable geometry.

BACKGROUND

As known, bicycles used in greatly-varying riding conditions, like mountain bikes or trekking bikes, are formed from a rear frame rotatably connected to a main frame, called front triangle, and a damper is arranged between them that limits the oscillations thereof.

In particular, the damper is hinged to the main frame and to an end of a rock-er link (also called Rocker Link), which is in turn hinged to the rear frame at an opposite end and to the main frame at an intermediate hinging point be-tween the two opposite ends. In the different riding conditions, which range from steep downhill slopes to steep uphill slopes, the distribution of the load between the front wheel and the rear wheel changes drastically. When the bicycle is ridden on flat terrain, roughly 70% of the weight force acts on the rear wheel and only 30% acts on the front wheel. On the other hand, when riding uphill, almost 100% of the weight acts on the rear wheel and when riding downhill it may be that almost 100% of the weight is supported by the front wheel.

With bicycles, like mountain bikes, which foresee the damper for damping the movement of the rear frame with respect to the main frame, there is a need to vary the rigidity of the damper and/or the geometry of the bicycle frame as a function of the terrain to be traveled on with the bicycle itself, i.e. as a function of whether the bicycle must travel on flat, uphill or downhill terrain.

An example of such bicycle frames is shown in document US 2014/0159338.

A purpose of the present invention is to satisfy such requirements of the prior art, in a simple, rational and advantageous solution.

Such purposes are accomplished by the characteristics of the invention given in the independent claim. The dependent claims outline preferred and/or particularly advantageous aspects of the invention.

SUMMARY

The invention, particularly, provides a bicycle frame comprising:

a main frame;

a rear frame articulated to the main frame;

a rocker link articulated to the main frame, through a first hinge axis, and to the rear frame, through a second hinge axis parallel and eccentric to the first hinge axis;

a damper arranged between the rear frame, through the rocker link, and the main frame; and a displacement element configured to move the first hinge axis that connects the rocker link to the main frame.

Thanks to such a solution, the bicycle frame can be adapted to the different travel situations in a simple and effective manner, by varying the geometry of the frame as a function of the various travel situations (uphill or downhill).

In practice, it is possible to move the first hinge axis so that the rocker link advances towards the front portion of the bicycle frame, in this way making the geometry of the bicycle frame more suitable for being ridden uphill (having at the same time moved the hinging point of the damper to the rocker link and the hinging point of the rear frame to the rocker link forwards), and—conversely—to move the first hinge axis so that the rocker link moves back towards the rear portion of the bicycle frame, in this way making the geometry of the bicycle frame more suitable for being ridden downhill.

In particular, by acting on the inclination and the position of the rocker link it is possible to vary the response and the rigidity of the damper making its action in response to the variation of slope to be dealt with (uphill or downhill) more suitable.

According to an aspect of the invention, the damper can be hinged to the rocker link through a third hinge axis parallel and eccentric to the first hinge axis and to the second hinge axis.

Preferably, the displacement element can be connected to the rocker link, i.e. it can be integrated with it.

Thanks to such a solution, the solution can be particularly compact and high-performing.

Advantageously, the displacement element can comprise an interconnection body connected in a movable manner to the rocker link, wherein the interconnection body is hinged to the main frame through the first hinge axis.

Preferably, the interconnection body can be rotatably connected to the rocker link about an oscillation axis parallel and eccentric with respect to the first hinge axis, in particular, the interconnection body is a body of revolution.

The oscillation axis of the interconnection body can be parallel and eccentric with respect to the second hinge axis and to the third hinge axis.

According to an aspect of the invention, the displacement element can comprise an actuator configured to move the interconnection body with respect to the rocker link.

Advantageously, the actuator can be a mechanical, hydraulic (or pneumatic) rotary (or linear) actuator, wherein for example the rotation axis of the actuator coincides with the oscillation axis of the interconnection body.

Moreover, there is no reason to exclude the possibility of the interconnection body being mobile with respect to the rocker link, for example manually or mechanically, in many predetermined positions (angular or along the trajectory).

In this way, the interconnection body can be actuated, for example manually with or without the use of actuation tools, to engage one of the various predetermined positions as a function of the desired geometry of the bicycle frame.

Moreover, in such a situation the movement of the interconnection body can be carried out cheaply.

Advantageously, the rocker link can comprise a housing in which the actuator is contained.

Thanks to such a solution, the actuator is integrated and protected inside the rocker link.

Advantageously, the first hinge axis (that constrains the rocker link to the main frame) can be movable between a first end stop position and a distinct second end stop position on a certain trajectory along the rocker link.

Thanks to such a solution, two limit positions of the geometry of the bicycle frame are predefined.

Advantageously, the displacement element can be configured to lock the first hinge axis selectively in one from the first end stop position, the second end stop position and an intermediate position between them.

BRIEF DESCRIPTION OF THE DRAWINGS

Further characteristics and advantages of the invention will become clear from reading the following description provided as an example and not for limiting purposes, with the help of the figures illustrated in the attached tables.

FIG. 2 is a schematic view of a detail of the rocker link of the bicycle frame of FIG. 1.

FIG. 3 is the section view along the section line III-III of FIG. 2.

DETAILED DESCRIPTION OF THE PREFERRED EMBODIMENTS

Figure 1:
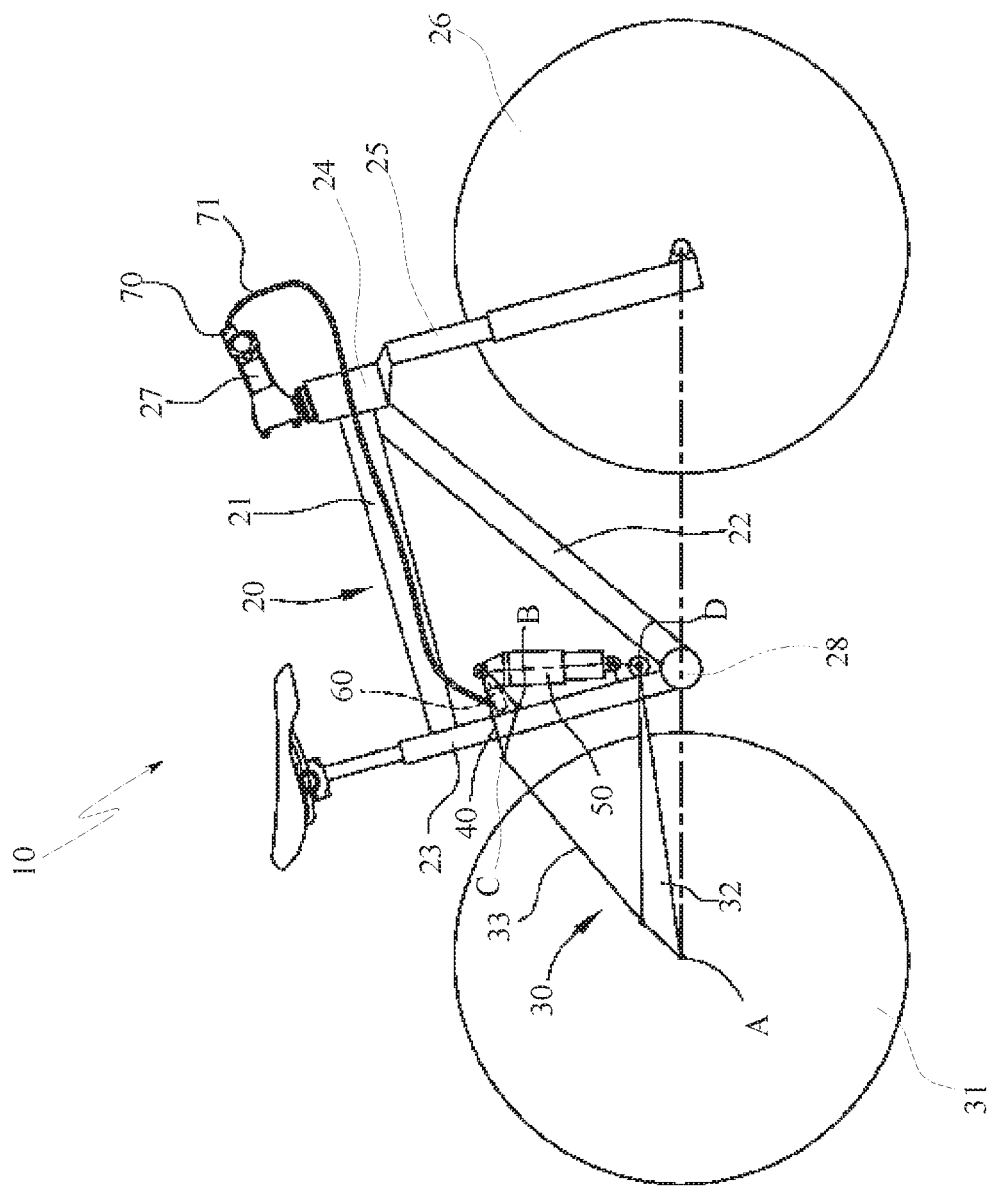
FIG. 1 is a schematic side view of a bicycle frame according to the invention.

With particular reference to such figures, a bicycle frame, for example a mountain-bike or trekking bike has been globally indicated with 10.

The bicycle 10 comprises a main frame 20 (or front triangle), for example substantially rigid.

The main frame 20 comprises, for example, a top tube 21, a down tube 22 and a seat tube 23.

At the intersection between the top tube 21 and the down tube 22 a steering column 24 is defined, which is arranged frontally with respect to the direction of forward motion of the bicycle 10 and is adapted for supporting a front fork 25, for example damped, to which a front wheel 26 is rotatably coupled.

Handlebars 27 for actuating the steering of the front wheel 26 are rigidly connected to the upper end of the front fork 25.

Close to the intersection between the down tube 22 and the seat tube 23 a seat of the bottom bracket 28 is defined, as known by those skilled in the art, which supports the bottom bracket itself in rotation.

The bicycle frame 10 also comprises a rear frame 30 (also called rear triangle) which is on the opposite side of the main frame 20 with respect to the steering column 24.

The rear frame 30 is adapted for supporting a rear wheel 31, which is rotatably connected to the rear frame with respect to a substantially horizontal rotation axis A.

The rear triangle 30 is articulated, as will be described better hereinafter, to the front triangle 20 with respect to one or more articulation axes parallel to the rotation axis A of the rear wheel 31.

The rear frame 30 is globally shaped like a fork that embraces the rear wheel 31 on opposite sides.

In the example illustrated in FIG. 1, the rear frame 30 comprises a pair of chain stays 32, arranged on opposite sides with respect to the rear wheel 31, at the rear end of which a seat is formed for the rotation pin of the rear wheel 31 and the front end of which faces (and projects) towards the seat of the bottom bracket 28.

The rear frame 30 also comprises two seat stays 33, arranged on opposite sides with respect to the rear wheel 31, wherein the rear end of each seat stay 33 is connected to the rear end of a respective chain stay 32 and the front end of each seat stay 33 faces (and projects) towards the seat tube 23.

Each chain stay 32 is hinged to a respective seat stay 33 (close to the rotation axis of the rear wheel 31) through a first articulation axis (parallel to the rotation axis A of the rear wheel 31).

Each chain stay 32 is also hinged to the main frame 20 (close to its front end, i.e. close to the seat of the bottom bracket 28), either directly or through interposition of an extension bar in turn hinged to the chain stay 32, through a second articulation axis (parallel to the rotation axis A of the rear wheel 31).

The configuration of the rear triangle 30 can be different from that illustrated and can be made according to any configuration known in the field of bicycle frames, as known by those skilled in the art.

The bicycle frame 10 also comprises a rocker link 40 (called rocker link), which is supported in a movable manner by the main frame 20, for example, by the seat tube 23, as will become clearer hereinafter.

The rocker link 40 is articulated to the main frame 20, for example, to the seat tube 23, for example in an intermediate point placed between the seat of the bottom bracket 28 and the intersection between the top tube 21 and the seat tube 23.

The rocker link 40 is hinged to the main frame 20 (to the seat tube 23) through a first hinge axis B (parallel to the rotation axis A of the rear wheel 31).

The rocker link 40 is schematically indicated as a triangle in FIG. 1.

The rocker link 40 has a rear end (defined by a vertex thereof), which pro-jects at the back of the seat tube 23, an opposite front end (defined by a vertex thereof), which projects at the front of the seat tube 23, and a central portion which is articulated to the seat tube 23, hinged to it through the first hinge axis B.

Each seat stay 33 is hinged to the rocker link 40, (in particular each front end of the seat stay 33 is hinged to the rear end of the rocker link 40) either directly or through interposition of an extension bar in turn hinged to the seat stay 32, through a second hinge axis C (parallel to the rotation axis A of the rear wheel 31) and eccentric with respect to the first hinge axis B.

The bicycle frame 10 also comprises a damper 50 which is arranged be-tween the main frame 20 and the rear frame 30, through the rocker link 40.

In particular, the damper 50 comprises:

a first end hinged to the main frame 20 (for example directly) through a hinging axis D parallel to the rotation axis A of the rear wheel 31; and a second end hinged to the rocker link 40, in particular to the rear end of the rocker link 40 (for example directly), through a third hinge axis E (parallel to the rotation axis A of the rear wheel 31) and eccentric with respect to the first hinge axis B and to the second hinge axis C.

The damper 50 is a linear damper configured to dampen the mutual oscillations between the main frame 20 and the rear frame 30 exerting a thrust or a constraining reaction directed axially along its longitudinal axis.

The hinging axis D between the damper 50 and the main frame 20 can be arranged in any point of the main frame 20, in the example it is arranged close to the seat of the bottom bracket 28.

In particular, the bicycle frame 10 comprises a displacement element 60 con-figured to move the first hinge axis B that articulates the rocker link 40 to the main frame 20.

In other words, the first hinge axis B has a variable position with respect to one of the main frame 20 and the rocker link 40, in the example with respect to the rocker link 40.

The displacement element 60 is configured to move the first hinge axis B along a predefined trajectory traced in the rocker link 40.

In the illustrated example, the predefined trajectory is an arc of circumference.

However, this does not rule out the possibility of the predefined trajectory being rectilinear or curvilinear according to any predetermined curve according to requirements.

Advantageously, the displacement element 60 is connected to the rocker link 40, in particular integrated in it (i.e. mobile with it).

In the example, the displacement element 60 comprises an interconnection body 61 which is connected in a movable manner to the rocker link 40.

The interconnection body 61 is, in the example, rotatably connected to the rocker link 40 about an oscillation axis F parallel and eccentric with respect to the first hinge axis B (and eccentric with respect to the second hinge axis C and to the third hinge axis E).

This does not rule out the possibility that the interconnection body 61 can be associated with the rocker link 40 in a sliding manner, for example through four-bar linkage (or an articulated parallelogram).

Figure 4:
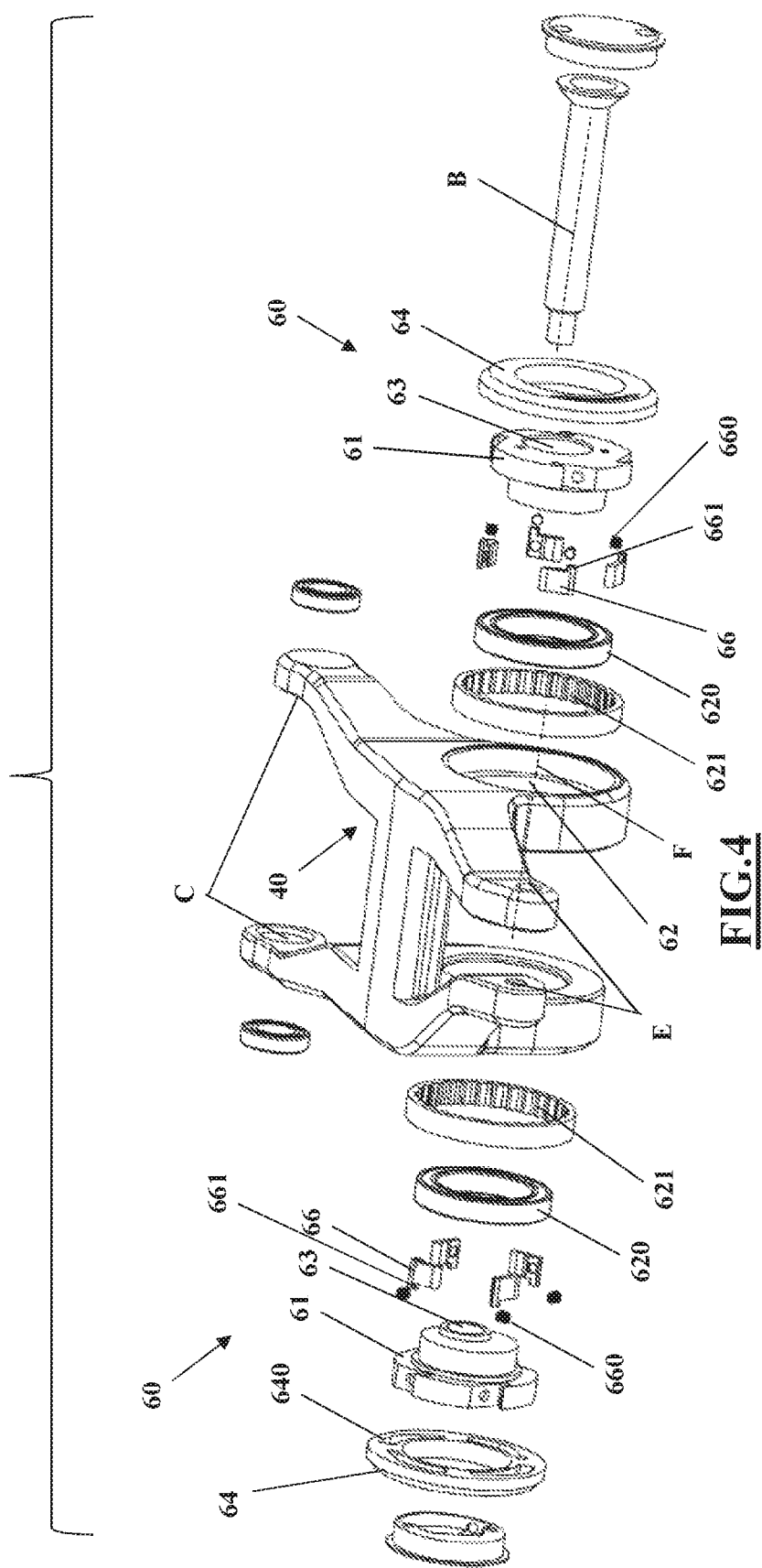
FIG. 4 is an exploded view of an alternative embodiment of the rocker link, i.e. a displacement element, of the bicycle frame of FIG. 1.

In the example, the interconnection body 61 is a body of revolution (for ex-ample discoidal/cylindrical) which is received, coaxially, inside a housing 62 of revolution (substantially cylindrical) made in the rocker link 40, for example (as shown in FIG. 4) through interposition of a bearing 620.

The oscillation axis F of the interconnection body 61 coincides with the axis of the housing 62.

The interconnection body 61 is hinged to the main frame 20 through the first hinge axis B.

In detail, the interconnection body 61 comprises a cylindrical seat 63, eccen-tric with respect to the central axis of the interconnection body itself, i.e. to the oscillation axis F, which defines the seat for the first hinge axis B (or pin) that rotatably constrains the interconnection body 61 to the main frame 20, i.e. constrains the rocker link 40 to the main frame itself.

In practice, a rotation (displacement) of the interconnection body 61 with respect to the rocker link 40, about its oscillation axis F, corresponds to a displacement of the first hinge axis B on the rocker link 40, i.e. a displacement of the hinging point of the rocker link 40 on the main frame 20.

In the preferred embodiment, the displacement element 60 comprises an ac-tuator 64 configured to move the interconnection body 61 with respect to the rocker link 40, i.e. to rotate the interconnection body 61 about its oscillation axis F.

In the example shown in FIG. 2, the actuator 64 is a rotary hydraulic actuator, preferably double-acting.

With particular reference to FIG. 2, the actuator 64 comprises a first piston 641 slidably inserted in a first cylinder 642 formed in the rocker link 40 and opening out (with one end) in the housing 62.

The axis of the first cylinder 642 is, for example, substantially tangential to the housing 62.

Moreover, the actuator 64 comprises a second piston 643 slidably inserted in a second cylinder 644 formed in the rocker link 40 and opening out (with one end) in the housing 62.

The axis of the second cylinder 644 is for example substantially tangential to the housing 62.

Each piston 641,643 divides the relative cylinder 642, 644 into two chambers, a first chamber facing towards the housing 62 and an opposite second chamber.

Each first chamber communicates with an interspace crown of the housing 62 that concentrically surrounds the interconnection body 61, at a distance.

In each first chamber and in the interspace crown a plurality of rolling balls 65 are arranged that join the relative piston 641,643 with a (relative) radial protuberance 610 projecting from the interconnection body 61.

In practice, the thrust of a piston 641,643 towards the housing 62 translates into a thrust of the rolling balls 65 on the protuberance 65 that causes the rotation in a respective direction of the interconnection body 61 inside the housing 62 itself.

The rolling balls 65 as well as keeping the interconnection body 61 centered in the housing 62 facilitate its rotation by acting as a (rolling) bearing.

It is possible to foresee that instead of the rolling balls other thrusting elements can be used, for example an incompressible fluid or other suitable medium.

A fluid, for example oil (or air), supplied by a suitable feeding circuit, is introduced into each second chamber.

The feeding circuit, equipped with a suitable pump, is configured to selectively put a second chamber under pressure, putting the other second chamber in discharge.

The feeding circuit is controllable through a remote control 70, like a lever or a button, which for example can be placed at the handlebars 27 and is connected, for example through a cable 71 or in a wireless manner, to the actuator 64.

The first hinge axis B is preferably mobile, along its trajectory, between a first end stop position and a different second end stop position, for example pre-defined as a function of the desired positions of the rocker link 40 with respect to the main frame 20, which define two respective configurations of the bicycle 1 with different cycling set-ups.

For example, the first end stop position is suitable for defining cycling set-ups for downhill use of the bicycle frame 10 and the second end stop position is suitable for defining cycling set-ups for uphill use thereof.

The displacement element 60, i.e. the actuator 64, is configured to lock the first hinge axis B, i.e. the interconnection body 61, selectively in one from the first end stop position, the second end stop position and any intermediate position between them.

In practice, it is possible to foresee a locking group, manual or integrated in the feeding circuit or mechanical, configured to lock the motion of the inter-connection body 61 in at least one from the first end stop position and the second end stop position and any intermediate position between them.

This does not rule out the possibility of the locking group being separate from the actuator 64, i.e. it can be an independent group that locks (for example mechanically) the interconnection body 61 in at least one from the first end stop position and the second end stop position and any intermediate position between them.

Alternatively, it is possible to foresee for the interconnection body 61 to be mobile with respect to the rocker link 40, i.e. to rotate the interconnection body 61 about its oscillation axis F or to move it along its trajectory, for ex-ample manually or mechanically, selectively in many predetermined positions (angular or along the trajectory).

For example, the interconnection body 61 can be received in its housing 62, for example through a substantially prismatic connection and can be withdrawable and re-insertable in various angular positions, for example in contrast to elastic thrusting means or other provisions that keep it in its seat.

In a further alternative shown in FIG. 4, the interconnection element 61 can have, in the outer periphery thereof, a plurality of fastening teeth 66 along a circumference coaxial with the oscillation axis F, the fastening teeth 66 are mobile in the radial direction from an enlarged position to a contracted position, in contrast to elastic means, for example a (helical) spring 660.

In the example the fastening teeth 66 are rotatably associated with the inter-connection element (received in respective seats) and, for example, have a substantially tangential harmonious inclination.

The fastening teeth 66 also have an axial appendage 661 projecting from the tip of the fastening teeth 66 and, for example, facing towards the outside of the rocker link 40.

In the illustrated example the rocker link 40 is associated with two interconnection elements 61, one right and one left, which have the fastening teeth 66 arranged opposing one another.

The fastening teeth 66 of each interconnection element 61 are adapted for fastening, when they are in the opened out position, to a sawtooth profile 621 fixed coaxially to the housing 62, for example made in a crown gear internally inserted (by interference) in a cylindrical seat coaxial to the housing 62.

The fastening teeth 66 of each interconnection element 61 are adapted for engaging in a pop-up manner with the respective sawtooth profile 621 during the rotation in one direction of rotation of the interconnection element 61 (and of the first hinge axis B) with respect to the oscillation axis F and blocking the rotation of the interconnection element 61 (and of the first hinge axis B) with respect to the oscillation axis F in the opposite direction of rotation.

Each interconnection element 61 is connected to a respective manual actuator 64. Each actuator 64 is of the ring nut type connected to the respective interconnection element 61, for example in a rotary manner with respect to it with respect to a rotation axis coinciding with the oscillation axis F.

The inner surface of each actuator 64 has a plurality of shaping grooves 640 in which the axial appendages 661 of the fastening teeth 66 are received. The shaping grooves 640 act as a cam for the respective fastening teeth 66, in particular when one of the actuators 64 is actuated in a certain direction of rotation the shaping grooves 640 are adapted for pushing the fastening teeth in their contracted position (in contrast to the springs) freeing the possibility of rotation of the interconnection element 61 (and therefore of the first hinge axis B) around the oscillation axis F in the same direction of rotation around the axis (at the same moment, the fastening teeth 66 of the other interconnection element 61 engage in a pop-up manner the respective sawtooth profile 621. For example, by actuating the right actuator 64 with a left-hand rotation the fastening teeth 66 of the right interconnection element 61 are brought into the contracted position freeing the possibility of (left-handed or clockwise) rotation of the interconnection element 61 and, therefore, of the first hinge axis B around the oscillation axis F, since the fastening teeth 66 of the left interconnection element 61, whilst being in opened out position, engage in a pop-up manner with the respective sawtooth profile 621; on the other hand, by actuating the left actuator 64 with a left-handed rotation the fastening teeth 66 of the left interconnection element 61 are brought into the contracted position freeing the possibility of (right-handed or anti-clockwise) rotation of the interconnection element 61 and, therefore, of the first hinge axis B around the oscillation axis F, since the fastening teeth 66 of the right interconnection element 61, whilst being in opened out position, engage in a pop-up manner with the respective sawtooth profile 621.

When the actuator 64 is not manually biased the fastening teeth 66 of each interconnection element 61 are in the opened out position and, therefore, engaged in the respective sawtooth profile 621, in this way the interconnection element 61 (and therefore the first hinge axis B) is locked in a desired (angular) position.

The invention thus conceived can undergo numerous modifications and variants, all covered by the inventive concept.

Moreover, all of the details can be replaced by other technically equivalent elements.

In practice, the materials used, as well as the contingent shapes and sizes, can be whatever according to the requirements without for this reason de-parting from the scope of protection of the following claims.

The invention claimed is:

1. A bicycle frame (10) comprising:
 a main frame (20); a rear frame (30) articulated to the main frame (20); a rocker link (40) articulated to the main frame (20), through a first hinge axis (B), and to the rear frame (30), through a second hinge axis (C) parallel and eccentric to the first hinge axis (B);
 a damper (50) arranged between the rear frame (30), through the rocker link (40), and the main frame (20); and
 a displacement element (60) configured to move the first hinge axis (B) that connects the rocker link (40) to the main frame (20) wherein the displacement element (60) comprises an interconnection body (61) connected in a movable manner to the rocker link (40), wherein the interconnection body (60) is hinged to the main frame (20) through the first hinge axis (B) and wherein the interconnection body (61) is rotatably connected to the rocker link (40) about an oscillation axis (F) parallel and eccentric with respect to the first hinge axis (B).

2. The bicycle frame (10) according to claim 1, wherein the damper (50) is hinged to the rocker link (40) through a third hinge axis (E) parallel and eccentric to the first hinge axis (B) and to the second hinge axis (C).

3. The bicycle frame (10) according to claim 1, wherein the displacement element (60) is connected to the rocker link (40).

4. The bicycle frame (10) according to claim 1, wherein the oscillation axis (F) is parallel and eccentric with respect to the second hinge axis (C) and to the third hinge axis (E).

5. The bicycle frame (10) according to claim 1, wherein the displacement element (60) comprises an actuator (64) configured to move the inter-connection body (61) with respect to the rocker link (40).

6. The bicycle frame (10) according to claim 5, wherein the actuator (64) is a rotary hydraulic actuator.

7. A bicycle frame (10) comprising:
 a main frame (20); a rear frame (30) articulated to the main frame (20); a rocker link (40) articulated to the main frame (20), through a first hinge axis (B), and to the rear frame (30), through a second hinge axis (C) parallel and eccentric to the first hinge axis (B);
 a damper (50) arranged between the rear frame (30), through the rocker link (40), and the main frame (20); and
 a displacement element (60) configured to move the first hinge axis (B) that connects the rocker link (40) to the main frame (20) wherein the displacement element (60) comprises an interconnection body (61) connected in a movable manner to the rocker link (40), wherein the interconnection body (60) is hinged to the main frame (20) through the first hinge axis (B) the displacement element (60) comprising an actuator (64) configured to move the inter-connection body (61) with respect to the rocker link (40) and wherein the rocker link (40) comprises a housing (62) in which the actuator (64) is contained.

8. The bicycle frame (10) according to claim 1, wherein the first hinge axis (B) is mobile between a first end stop position and a different second end stop position on a determined trajectory traced along the rocker link (40).

9. The bicycle frame (10) according to claim 8, wherein the displacement element (60) is configured to lock the first hinge axis (B) selectively in one of the first end stop position, the second end stop position and any intermediate position therebetween.

* * * * *